(12) United States Patent
Terao

(10) Patent No.: US 7,433,919 B2
(45) Date of Patent: Oct. 7, 2008

(54) INFORMATION PROCESSING SYSTEM

(75) Inventor: Taro Terao, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 844 days.

(21) Appl. No.: 10/658,810

(22) Filed: Sep. 10, 2003

(65) Prior Publication Data

US 2004/0199570 A1    Oct. 7, 2004

(30) Foreign Application Priority Data

Feb. 14, 2003   (JP)   ............................ 2003-037440

(51) Int. Cl.
G06F 15/16   (2006.01)
G06F 7/00    (2006.01)
G06F 17/00   (2006.01)
G06F 12/00   (2006.01)
G06F 17/30   (2006.01)

(52) U.S. Cl. .......................... 709/203; 709/201; 707/1; 707/100; 707/101; 707/102; 707/103; 707/205

(58) Field of Classification Search .............. 709/203, 709/201; 707/1, 100, 101, 102, 103, 205
See application file for complete search history.

(56) References Cited

U.S. PATENT DOCUMENTS 5,978,791 A    11/1999  Farber et al.
6,415,280 B1   7/2002   Farber et al.
6,871,245 B2 * 3/2005   Bradley ......................... 710/65
7,117,227 B2 * 10/2006  Call ........................... 707/104.1
7,284,243 B2 * 10/2007  Burgess ........................ 717/175
2002/0052884 A1 * 5/2002 Farber et al. ............... 707/104.1
2002/0105974 A1 * 8/2002 Cheng et al. ................. 370/510
2003/0005047 A1 * 1/2003 Seki et al. .................... 709/203
2003/0097320 A1 * 5/2003 Gordon ......................... 705/35
2003/0105811 A1 * 6/2003 Laborde et al. ............. 709/203

OTHER PUBLICATIONS

Bach, "Design of UNIX Kernel", translated into Japanese by Aya Sakamoto, Yoshikatu Tada and Jun Murai, published by Kyoritsu Shuppan Co., Ltd. as the first edition on Jun. 10, 1991, pp. 91-96.
Goto, "Monocopy and Associative Algorithms in an Extended Lisp", 1974, 1-A3, Information Science Laboratory Faculty of Science, University of Tokyo.

* cited by examiner

*Primary Examiner*—Ashok B. Patel
*Assistant Examiner*—Mark D Fearer
(74) *Attorney, Agent, or Firm*—Oliff & Berridge, PLC

(57) ABSTRACT

An information processing system includes a server computer system which holds pieces of data as processing objects and characteristic values calculated on the basis of the pieces of data while associating the pieces of data with the characteristic values respectively, accepts a characteristic value as information requesting a piece of data as a processing object from a requester and selects the piece of data associated with the accepted characteristic value from the held pieces of data so as to provide the piece of data to the requester; and a client-side computer system which is communicatably connected to the server computer system and acquires pieces of data as processing objects from the server computer system.

12 Claims, 5 Drawing Sheets

| CHARACTERISTIC VALUE | ACTUAL DATA |
|---|---|
| a a a a | b b b b b ⋯ |
| c c c c | d d d d d d ⋯ |
| ⋮ | ⋮ |
| | |

| CHARACTERISTIC VALUE | ACTUAL DATA OR SEQUENCE OF CHARACTERISTIC VALUE |
|---|---|
| a a a a | b b b b b ⋯ |
| e e e e | d d d d d d ⋯ |
| ⋮ | ⋮ |
| x x x x | a a a a, e e e e ⋯ |
| ⋮ | ⋮ |
| | |

INFORMATION PROCESSING SYSTEM

BACKGROUND OF THE INVENTION

1. Field of the Invention

The present invention relates to an information processing system for holding and providing information as processing objects.

2. Description of the Related Art

The development of computer technology and the degree of spread of computer technology in society have increased more and more recently. It is not too much to say that there is now no device free from being controlled by a computer. Under such circumstances, each user of a computer, that is, an end user, a program developer, an information provider, or the like, generally uses information such as filenames for specifying pieces of data as processing objects in the computer.

In the inside of the computer, a filename is converted into a corresponding pointer (e.g., index node, i.e., i-node), so that a piece of data corresponding to the filename is read from a position designated by the pointer on a disk. Such a general method in the related art has been described in detail, for example, in "Design of UNIX Kernel" written by Maurice J. Bach, translated into Japanese by Aya Sakamoto, Yoshikatu Tada and Jun Murai, published by KYORITSU SHUPPAN CO., LTD. as the first edition on Jun. 10, 1991.

In the related-art method of providing and acquiring pieces of data as processing objects, convenience to the user is however poor because the user must think out filenames. On the other hand, there is a device for generating a filename on the basis of a leading portion of each piece of data. When, for example, the user needs to generate a large number of reports, there is the possibility that a lot of filenames will begin with "report" or the like. Accordingly, convenience is still poor.

SUMMARY OF THE INVENTION

The invention is developed in consideration of such circumstances and an object of the invention is to provide an information processing system highly convenient to users.

To achieve the above object, according to one aspect of the invention, there is provided an information processing system including: a server computer system which holds pieces of data as processing objects and characteristic values calculated on the basis of the pieces of data while associating the pieces of data with the characteristic values respectively, accepts a characteristic value as information requesting a piece of data as a processing object from a requester and selects the piece of data associated with the accepted characteristic value from the held pieces of data so as to provide the piece of data to the requester; and a client-side computer system which is communicatably connected to the server computer system and acquires pieces of data as processing objects from the server computer system.

According to another aspect of the invention, there is provided a computer system including: a holding unit for holding pieces of data as processing objects and characteristic values calculated on the basis of the pieces of data while associating the pieces of data with the characteristic values respectively; and a providing unit for accepting a characteristic-value as information requesting a piece of data as a processing object from a requester and selecting the piece of data associated with the accepted characteristic value from the pieces of data held by the holding unit so as to provide the piece of data to the requester.

Preferably, the computer system further includes an operation unit for calculating a characteristic value on the basis of a piece of data as a processing object, wherein the operation unit divides the piece of data as a processing object into a sequence of data fragments each having a predetermined size, calculates characteristic values based on the data fragments in accordance with the data fragments respectively, holds the data fragments and the characteristic values in the holding unit while associating the data fragments with the characteristic values respectively, generates a sequence of characteristic values corresponding to the sequence of data fragments, calculates a characteristic value based on the sequence of characteristic values, and holds the sequence of characteristic values and the characteristic value calculated based on the sequence of characteristic values in the holding unit while associating the sequence of characteristic values with the characteristic value calculated based on the sequence of characteristic values.

Preferably, the operation unit calculates the characteristic value based on the sequence of characteristic values by a repetitive operation for respective characteristic values contained in the sequence of characteristic values at the time of calculation of the characteristic value based on the sequence of characteristic values; and when the sequence of characteristic values is composed of N characteristic values, the operation unit holds a result of the repetitive operation for one to N−1 characteristic values in the holding unit.

Preferably, the computer system further includes an operation unit for calculating a characteristic value on the basis of a piece of data as a processing object, wherein the operation unit divides the piece of data as a processing object into a sequence of data fragments each having a predetermined size, calculates characteristic values based on the data fragments in accordance with the data fragments respectively, compares the size of each calculated characteristic value with the predetermined size, holds the data fragment per se in the holding unit when the predetermined size is smaller than the size of the calculated characteristic value but holds the data fragment and the characteristic value associatively in the holding unit when the predetermined size is larger than the size of the calculated characteristic value, generates a characteristic value-containing sequence corresponding to the sequence of data fragments, calculates a characteristic value based on the characteristic value-containing sequence, and holds the characteristic value-containing sequence and the characteristic value calculated based on the characteristic value-containing sequence in the holding unit while associating the characteristic value-containing sequence with the characteristic value calculated based on the characteristic value-containing sequence.

Preferably, the holding unit holds a characteristic value calculated on the basis of a characteristic value set containing at least one characteristic value; and the providing unit provides respective characteristic values contained in a characteristic value set to the requester when a characteristic value accepted as information requesting a piece of data as a processing object is associated with the characteristic value set.

Preferably, the holding unit holds characteristic value calculation method specifying information for specifying a characteristic value calculation method in association with the characteristic value. Preferably, the holding unit holds the characteristic value containing information concerning a predetermined calculation state at a point of time of calculation of the characteristic value.

According to still another aspect of the invention, there is provided an information processing method executed by a computer system, including the steps of: holding pieces of data as processing objects and characteristic values calculated on the basis of the pieces of data while associating the pieces of data with the characteristic values respectively; and accepting a characteristic value as information requesting a piece of data as a processing object from a requester and selecting the piece of data associated with the accepted characteristic value from the held pieces of data so as to provide the piece of data to the requester.

According to yet still another aspect of the invention, there is provided a program executed by a computer system, including: a procedure for holding pieces of data as processing objects and characteristic values calculated on the basis of the pieces of data while associating the pieces of data with the characteristic values respectively; and a procedure for accepting a characteristic value as information requesting a piece of data as a processing object from a requester and selecting the piece of data associated with the accepted characteristic value from the held pieces of data so as to provide the piece of data to the requester.

Incidentally, the program may be stored in a recording medium that can be read by a computer.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFFERED EMBODIMENTS

Figure 1:
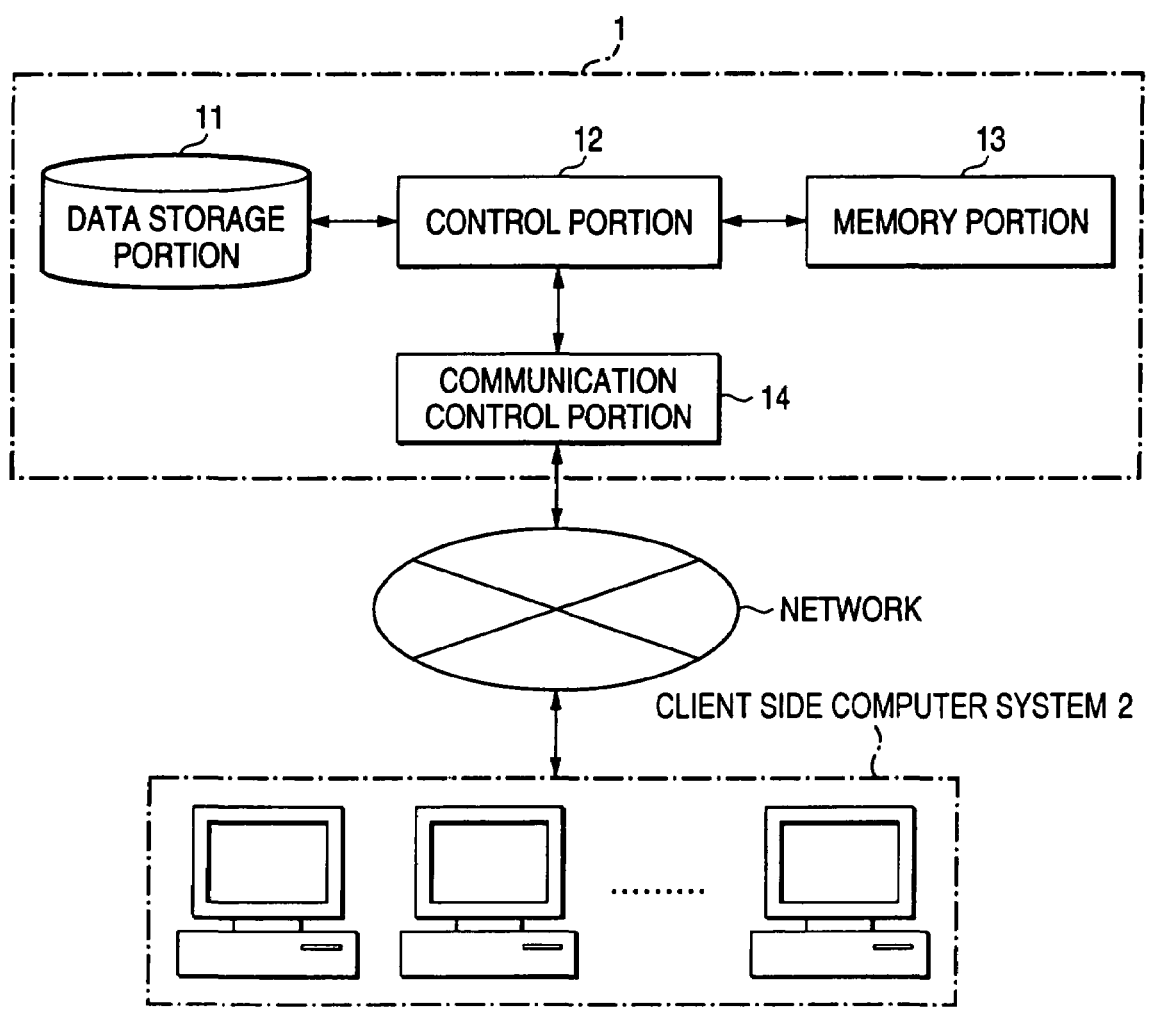
FIG. 1 is a configuration block diagram of an information processing system according to an embodiment of the invention.

An embodiment of the invention will be described below with reference to the drawings. As shown in FIG. 1, an information processing system according to an embodiment of the invention has a server computer system 1, and a client-side computer system 2. The server computer system 1 includes a data storage portion 11, a control portion 12, a memory portion 13, and a communication control portion 14. The client-side computer system 2 includes at least one personal computer. Each of the server computer system 1 and the client-side computer system 2 is a computer system including at least one computer.

The server computer system 1 and the client-side computer system 2 are connected to each other through a network. Examples of the network used herein include various kinds of data communication paths such as serial transmission lines (inclusive of USB, IEEE1394, etc.), and electrical communication lines (Ethernet (registered-trademark), etc.).

Figures 2A, 2B:
FIGS. 2A and 2B are explanatory views showing examples of information stored in a data storage portion.

The data storage portion 11 of the server computer system 1 holds data entities as processing objects of the client-side computer system 2 and characteristic values calculated on the basis of the data entities. Specifically, the data storage portion 11 basically stores data entities and characteristic values calculated on the basis of the data entities while associating the data entities with the characteristic values respectively as shown in FIG. 2A.

The control portion 12 operates according to a program stored in the memory portion 13. The control portion 12 executes a process (operation process) for calculating a characteristic value corresponding to a data entity as a processing object on the basis of an instruction received from the client-side computer system 2 through the communication control portion 14 to thereby associatively store the data entity and the characteristic value in the data storage portion 11. Upon reception of a characteristic value and a request for data corresponding to the characteristic value from the client-side computer system 2, the control portion 12 retrieves a data entity associated with the characteristic value from the data storage portion 11. When a data entity associated with the characteristic value is found from the data storage portion 11 as a result of the retrieval, the control portion 12 instructs the communication control portion 14 to send the data entity to the client-side compute system 2 (providing process).

More detailed description of the operation process and the providing process executed by the control portion 12 and detailed description of modifications thereof will be made later.

Figure 5:
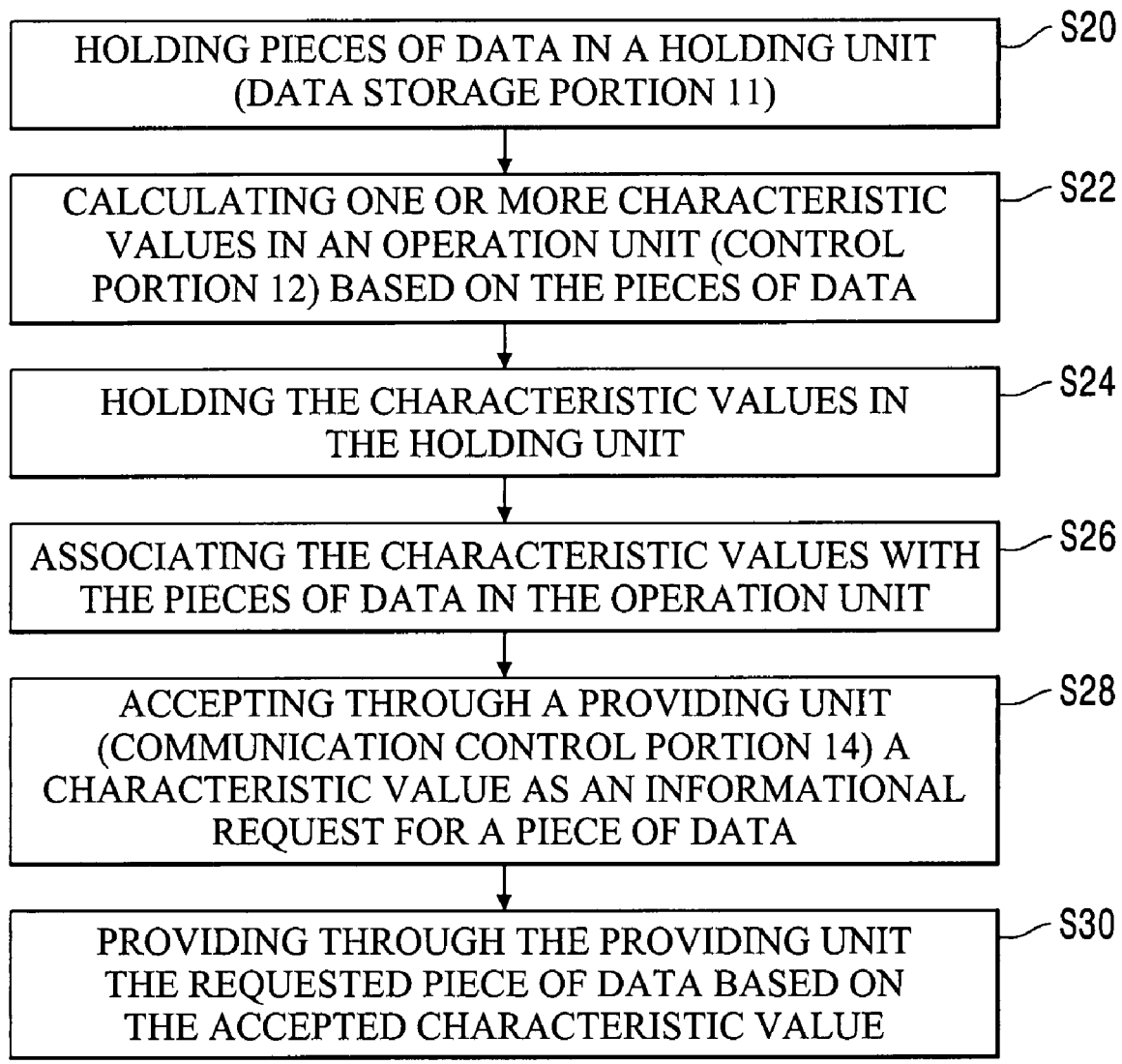
FIG. 5 is a flow chart of an exemplary process for responding to a request.

FIG. 5 shows an exemplary flow chart of the above described process. In step S20, a holding unit, which may be data storage portion 11, holds pieces of data, and the process goes to step S22. In step S22, an operation unit, which may be control portion 12, calculates characteristic values based on the pieces of data, and the process goes to step S24. In step S24, the holding unit holds the calculated characteristic values, and the process goes to step S26. In step S26, the operation unit associates the calculated characteristic values with the pieces of data, and the process goes to step S28. In step S28, a providing unit, which may be communication control portion 14, accepts a characteristic value as an informational request for a piece of data, and the process goes to step S30. In step S30, the providing unit provides the requested piece of data based on the accepted characteristic value.

The memory portion 13 includes a disk device for holding a program executed by the control portion 12, and an RAM (Random Access Memory) as a work memory for storing data generated in the middle of the process executed by the control portion 12. The communication control portion 14 is connected to the network, so that the communication control portion 14 receives data and requests coming through the network and delivers the data and requests to the control portion 12. The communication control portion 14 sends data to the client-side computer system 2 through the network in accordance with an instruction given from the control portion 12. Incidentally, the communication control portion 14 outputs information for identifying a sender of received data to the control portion 12, so that the control portion 12 carries out a process for identifying the sender for the communication control portion 14 on the basis of the information. Because the process for identifying the sender is commonly known communication techniques, detailed description thereof will be omitted.

The specific contents of the process executed by the control portion 12 and a modified example of the process will be described below. The operation process of the control portion 12 will be described first. The control portion 12 calculates a characteristic value on the basis of a piece of data as a processing object by a predetermined method and stores the piece of data and the characteristic value in the data storage portion 11 in association with each other (FIG. 2A). For example, the characteristic value used herein may be a hash value (which is a value obtained by a suitable cryptographic hash function. An example of the cryptographic hash function is SHA-1) based on the piece of data. Any characteristic value may be used if the characteristic value can be calculated by an arbitrary random function. That is, there is no problem if characteristic values used herein are unique to pieces of data respectively. Furthermore, it is preferable that characteristic values are data (contents) identifiers distributed sparsely on a sufficiently wide space and decided on the basis of pieces of data (contents) automatically.

Although the following example will be described on the case where a characteristic value is a hash value having 20 bytes, the invention is not limited thereto.

Figure 3:
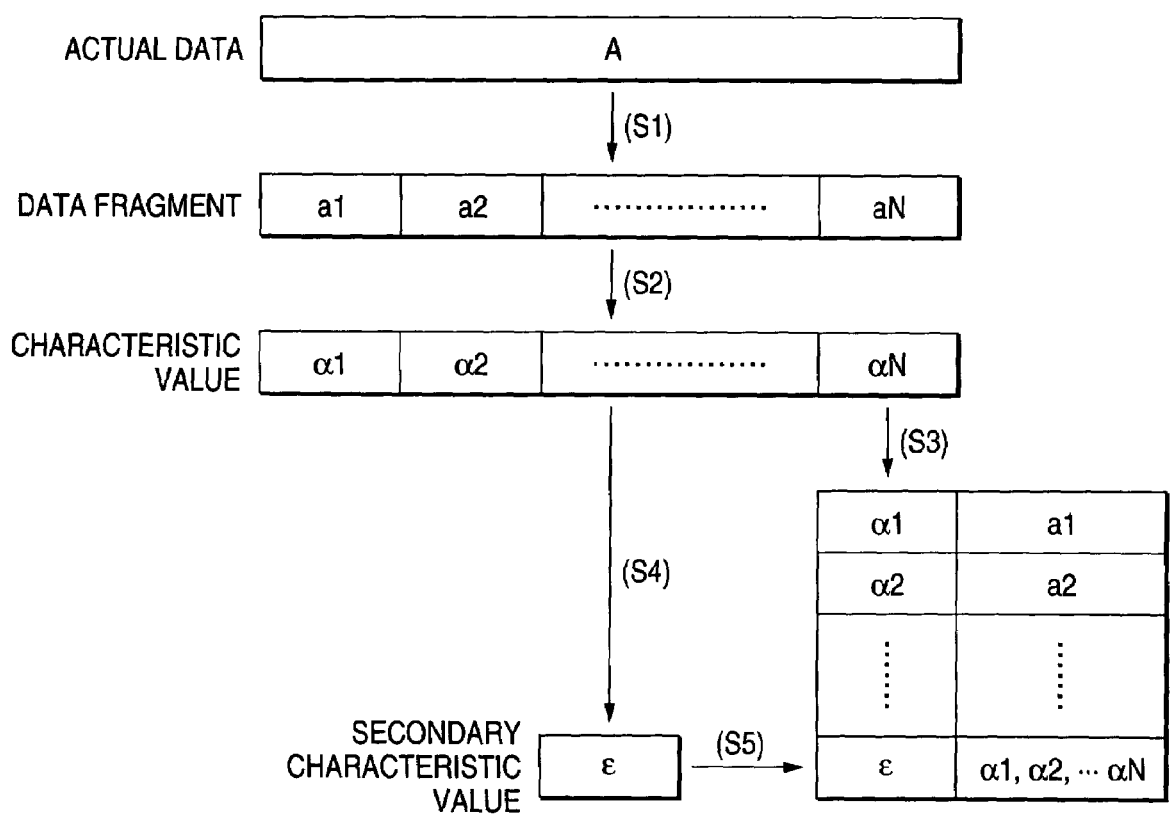
FIG. 3 is an explanatory view showing the outline of an operation process.

The control portion 12 may carry out the operation process as follows. That is, the control portion 12 may carry out the operation process as shown in FIG. 3. The control portion 12 divides a piece of data as a processing object into data fragments each having a fixed length to thereby form a sequence of data fragments (S1). The control portion 12 calculates characteristic values (which may be hereinafter referred to as primary characteristic values) on the basis of the data fragments respectively (S2). The control portion 12 stores the data fragments and the characteristic values generated on the basis of the data fragments respectively in the data storage portion 11 in association with each other (S3). The control portion 12 further generates a characteristic value (which may be hereinafter referred to as secondary characteristic value for the sake of discrimination from each primary characteristic value but may be a 20-byte hash value calculated in the same manner as the primary characteristic value) for the sequence of characteristic values corresponding to the sequence of data fragments (S4). The control portion 12 stores the sequence of characteristic values and the secondary characteristic value for the sequence of characteristic values in the data storage portion 11 in association with each other (S5). Accordingly, in this case, in addition to or instead of the table as shown in FIG. 2A, data fragments, characteristic values for the data fragments and a secondary characteristic value for the sequence of characteristic values as shown in FIG. 2B are stored in the data storage portion 11 in association with one another.

When a piece of data is divided into data fragments in the aforementioned manner, the providing process of the control portion 12 and the operation of the client-side computer system 2 corresponding to the providing process are carried out as follows. That is, the client-side computer system 2 sends a secondary characteristic value corresponding to a piece of required processing object data to the server computer system 1. The control portion 12 of the server computer system 1 accepts the secondary characteristic value through the communication control portion 14 and acquires a sequence of characteristic values corresponding to the secondary characteristic value from the data storage portion 11. Then, the control portion 12 acquires data fragments (fragments of an actual data) corresponding to the sequence of characteristic values respectively, generates the piece of original data by combining the data fragments and sends the piece of original data to the client-side computer system 2 as a requester through the communication control portion 14.

Incidentally, when the size of a tail of the piece of processing object data is smaller than the size of each data fragment at the time of generation of data fragments in the operation process by the control portion 12, the tail is preferably padded with a predetermined value.

Figure 4:
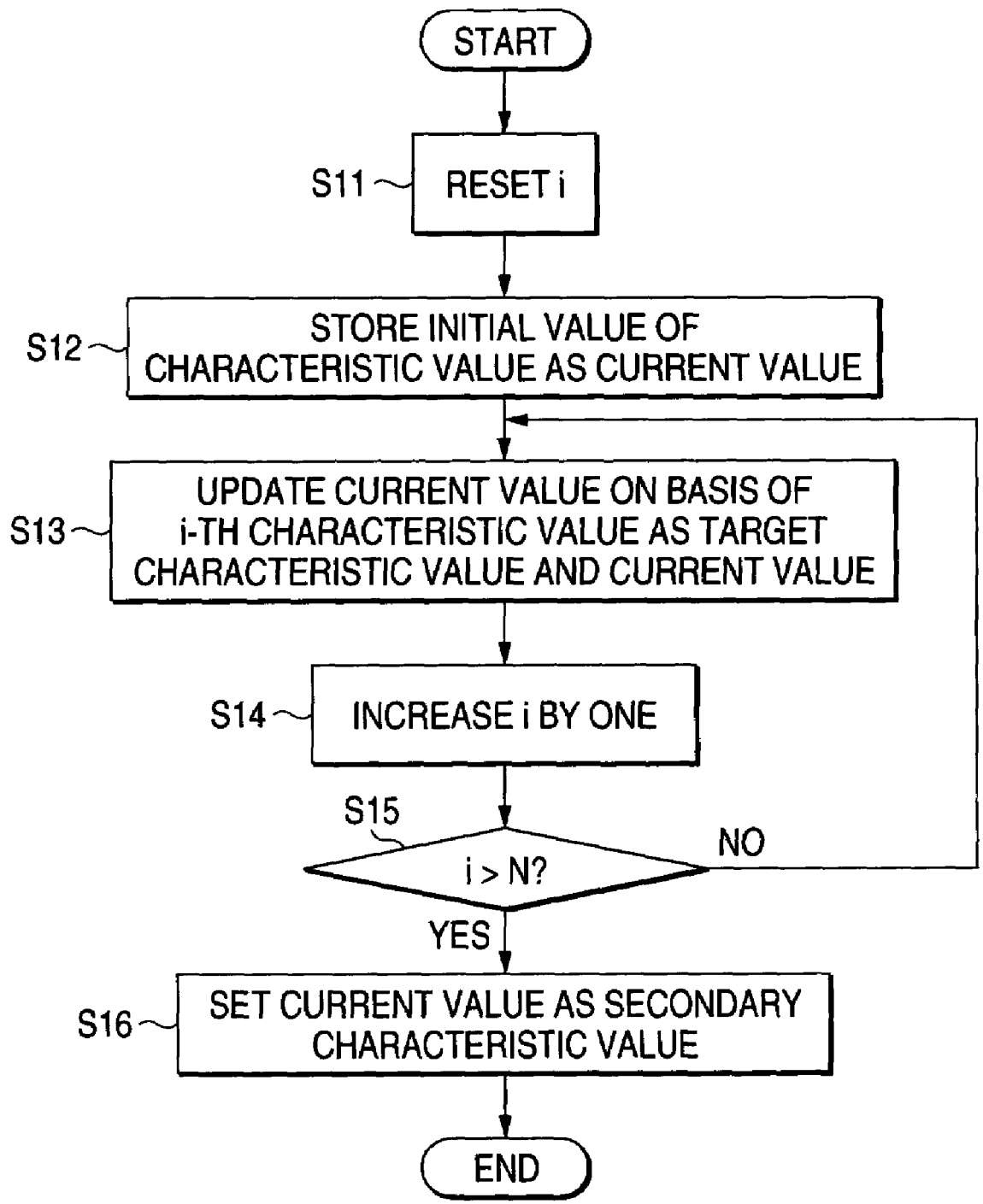
FIG. 4 is a flow chart showing an example of calculation of characteristic values.

The characteristic values used herein may be calculated by a repetitive operation. That is, the control portion 12 may carry out a process as shown in FIG. 4, for example, for calculation of a secondary characteristic value. That is, the control portion 12 resets a counter i held in the memory portion 13 to "1" (S11). The control portion 12 stores the initial value of a characteristic value as a current value of the characteristic value in the memory portion 13 (S12). The control portion 12 regards the i-th one of N characteristic values contained in a sequence of characteristic values as a target characteristic value, updates the current characteristic value on the basis of the target characteristic value and the current value currently stored in the memory portion 13 and stores the updated current value in the memory portion 13 (S13). Then, the control portion 12 increases i by one (S14) and judges whether i is larger than N or not (S15). When i is not larger than N (i.e., the judgment is No), the routine of processing goes back to the step S13 to continue the process. When i is larger than N (i.e., the judgment is Yes) in the step S15, the current value stored in the memory portion 13 at this point of time is output as the secondary characteristic value (S16) and the process is terminated.

The process shown in FIG. 4 may be modified as follows. That is, before the step S15, the control portion 12 judges whether i is equal to N or not. When i is equal to N, the current value (as a result of the repetitive operation for one to N−1 characteristic values) at this point of time is stored in the memory portion 13. In the step S16, the secondary characteristic value and the result of the repetitive operation for one to N−1 characteristic values are output so that these are stored in the data storage portion 11 in association with the sequence of characteristic values.

According to the modified process, when, for example, the piece of data as a processing object is updated after that so that a new data portion is added to the tail of the piece of data as a processing object, the following two effects can be obtained. Firstly, when the operation process needs to be applied to the piece of updated data, only respective characteristic values corresponding to data fragments after a data fragment (N-th data fragment) which is the tail of the piece of previous data can be calculated. Secondly, when the secondary characteristic value for the updated data needs to be calculated, a volume equivalent to the secondary characteristic value for N−1 characteristic values has been already calculated and held, so that the operation process can be started from a characteristic value for the N-th data fragment in the condition that i=N is set in the step S11 while the equivalent volume (as a result of the repetitive operation for one to N−1 characteristic values in the piece of previous data) is set as the initial value of the characteristic value in the step S12. Accordingly, load imposed on the operation process can be lightened.

When the number of bits in a characteristic value is not fixed, there may be conceivable the possibility that the size of the characteristic value may be larger than the size of a piece of actual data or the size of the characteristic value may be larger than the size of a data fragment. In such a case, the piece of actual data or the data fragment per se may be used as a characteristic value substituted for the calculated characteristic value. This is because the size of the data as a whole can be reduced to thereby lighten load imposed on communication or the like.

In this case, for example, the control portion 12 calculates characteristic values based on data fragments in accordance with the data fragments respectively and compares the size of each calculated characteristic value with the size of the data fragment. When the size of the data fragment is smaller than the size of the calculated characteristic value, the control portion 12 stores the data fragment per se as a characteristic value in the data storage portion 11.

When the size of the data fragment is larger than the size of the calculated characteristic value, the control portion 12 stores the data fragment and the characteristic value in the data storage portion 11 in association with each other.

The secondary characteristic value may be provided not only for a sequence of characteristic values calculated on the basis of one piece of actual data but also for a set of characteristic values calculated on the basis of a plurality of pieces of actual data. The set of characteristic values may further contain another secondary characteristic value. That is, assuming that a characteristic value α is calculated for a piece of actual data A, a sequence β of characteristic values are calculated for a piece of actual data B and a secondary characteristic value γ is calculated for the sequence β of characteristic values, then another secondary characteristic value ε may be calculated for a set of the characteristic value α and the secondary characteristic value γ and stored in the data storage portion 11 in association with α and γ.

According to this configuration, when, for example, only ε is known, the client-side computer system 2 can send ε to the server computer system 1 to request data corresponding to ε. As a result, the server computer system 1 sends α and γ to the client-side computer system 2. Accordingly, when the client-side computer system 2 needs the piece of actual data A, the client-side computer system 2 can further send the received characteristic value α to the server computer system 1 to request the piece of actual data A. In this manner, a file system having a hierarchical structure can be constructed in the server computer system 1.

Incidentally, the control portion 12 may further store a method for calculation of each characteristic value in the data storage portion 11 in association with each characteristic value. Or each characteristic value may contain information concerning the state of predetermined operation at the point of time of calculation of the characteristic value, such as the date of calculation of the characteristic value, information of authentication of a person designating the calculation, and so on. When each characteristic value contains authentication information and so on as described above, respective pieces of processing object data can be distinguished from one another, for example, even in the case where characteristic values cannot be uniquely allocated to the number of pieces of processing object data (the number of bits in each characteristic value is small).

The information processing system according to this embodiment is configured as described above and operates as follows. A piece of processing object data generated in the client-side computer system 2 by the user is sent to the server computer system 1 through the network.

Upon reception of the piece of processing object data, the server computer system 1 calculates a hash value as a characteristic value based on the piece of processing object data, stores the hash value in association with the piece of processing object data and sends the hash value to the client-side computer system 2.

When the piece of processing object data satisfies a predetermined condition that, for example, the piece of processing object data is longer than a predetermined size, the server computer system 1 divides the piece of processing object data into data fragments each having a predetermined size, calculates hash values on the basis of the data fragments respectively and stores the data fragments and the hash values calculated on the basis of the data fragments in association with each other. Then, the server computer system 1 further calculates a hash value as a secondary characteristic value on the basis of a hash value sequence obtained by arranging the hash values in the sequence of the data fragments, stores the hash value as the secondary characteristic value in association with the hash value sequence and sends the secondary characteristic value to the client-side computer system 2.

The client-side computer system 2 designates a plurality of hash values in accordance with the user's operation and sends an instruction to the server computer system 1 to group the plurality of hash values (collect the plurality of hash values into a directory).

Upon reception of the instruction, the server computer system 1 recognizes the plurality of hash values designated by the instruction as a hash value set (characteristic value set), calculates a hash value on the basis of the characteristic value set, stores the characteristic value set and the hash value in association with each other and sends the hash value based on the characteristic value set to the client-side computer system 2.

Next, when a piece of actual data is required, the client-side computer system 2 operates as follows. When a hash value corresponding to a piece of actual data as a processing object is known, the hash value can be sent to the server computer system 1 and the server computer system 1 can send a piece of actual data corresponding to the hash value to the client-side computer system 2 as a requester.

Even in the case where a hash value corresponding to a piece of actual data is directly unknown, when a hash value corresponding to a set of grouped characteristic values is known, the hash value can be sent to the server computer system 1 and the server computer system 1 can send a characteristic value set (hash value set) corresponding to the hash value to the client-side computer system 2 as a requester. Accordingly, a hash value contained in the characteristic value set and corresponding to a piece of required data can be used.

When hash values (characteristic values) corresponding to such characteristic value sets are further used as a characteristic value set (secondary set) so that a characteristic value corresponding to the secondary set is further calculated, a hierarchical directory structure can be expressed. In this case, the client-side computer system 2 can operate so long as a characteristic value corresponding to a directory (i.e., a characteristic value set) equivalent to a route directory is known. Accordingly, when, for example, information of about 20 bytes is carried along with the user, the user's own data can be taken out in any place if the client-side computer system 2 is under the environment where the client-side computer system 2 can communicate with the server computer system 1.

Furthermore, users can exchange files with one another by sending hash values corresponding to pieces of actual data. Incidentally, when each hash value contains about 20 bytes as described in this example, pieces of actual data are discrete in spite of a group of values expressed by 20 bytes. Accordingly, even in the case where a malicious user generates a 20-byte value arbitrarily and sends the 20-byte value to the server computer system 1, there is little possibility that any piece of actual data will be present in accordance with the 20-byte value generated arbitrarily. Furthermore, when each piece of data is divided into fragments, no data but some data fragment is acquired in most cases (because the number of hash values corresponding to data fragments is larger than the number of hash values as secondary characteristic values) even if there is a piece of data corresponding to the 20-byte value. Accordingly, the possibility that a significant data will be acquired is still considerably low.

As described above, in the information processing system according to this embodiment, the possibility that information will leak is very low.

Incidentally, data as preview images of one piece of original actual data may be associated with hash values corresponding to the piece of actual data or hash values as secondary characteristic values obtained by dividing the piece of actual data into fragments so that the preview image data can be provided to the client-side computer system as occasion demands.

As described above, in the information processing system according to this embodiment, a user can specify and acquire each piece of data as a processing object without necessity of setting a filename for the piece of data as a processing object, so that convenience is improved.

Although the above description has been made on the case where the server computer system 1 and the client-side computer system 2 are provided separately, the invention may be also applied to the case where these systems 1 and 2 are integrated as one computer system.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable on skilled in the art to utilize the invention in various embodiments and with various modifications as are suited to the particular use contemplates. It is intended that the scope of the invention be defined by the claims appended hereto, and their equivalents.

What is claimed is:

1. A computer system comprising:
a holding unit for holding pieces of data as processing objects and first characteristic values calculated based on the pieces of data while associating the pieces of data with the first characteristic values respectively;
a providing unit for accepting a received characteristic value as an information request for a piece of data as a processing object from a requester and selecting the piece of data associated with the received characteristic value from the pieces of data held by the holding unit to provide the piece of data to the requester;
an operation unit for calculating a characteristic value based on a piece of data as a processing object, wherein the operation unit divides the piece of data into a sequence of data fragments each having a predetermined size, calculates second characteristic values based on the data fragments respectively, holds the data fragments and the second characteristic values in the holding unit while associating the data fragments with the second characteristic values respectively, generates a sequence of the second characteristic values corresponding to the sequence of data fragments, calculates the characteristic value based on the sequence of the second characteristic values, and holds the sequence of the second characteristic values and the characteristic value in the holding unit while associating the sequence of the second characteristic values with the characteristic value.

2. A computer system according to claim 1, wherein the operation unit calculates the characteristic value based on the sequence of characteristic values by a repetitive operation for respective characteristic values contained in the sequence of characteristic values at a time of calculation of the characteristic value based on the sequence of characteristic values; and
when the sequence of characteristic values comprises N characteristic values, the operation unit holds a result of the repetitive operation for one to N−1 characteristic values in the holding unit.

3. A computer system according to 1, wherein the holding unit holds information for specifying a characteristic value calculation method in association with the characteristic value.

4. A computer system according to claim 1, wherein the holding unit holds a characteristic value containing information concerning a predetermined calculation state at a point of time of calculation of the characteristic value.

5. A computer system comprising:
a holding unit for holding pieces of data as processing objects and first characteristic values calculated based on the pieces of data while associating the pieces of data with the first characteristic values respectively;
a providing unit for accepting a received characteristic value as an information request for a piece of data as a processing object from a requester and selecting the piece of data associated with the received characteristic value from the pieces of data held by the holding unit to provide the piece of data to the requester;
an operation unit for calculating a characteristic value based on a piece of data as a processing object, wherein the operation unit divides the piece of data into a sequence of data fragments each having a predetermined size, calculates second characteristic values based on the data fragments respectively, compares a size of each of the second characteristic values with the predetermined size, holds a data fragment without an associated second characteristic value in the holding unit when the predetermined size is smaller than the size of the associated second characteristic value but holds the data fragment and the associated second characteristic value in the holding unit when the predetermined size is larger than the size of the associated second characteristic value, generates a second characteristic value-containing sequence corresponding to the sequence of data fragments, calculates the characteristic value based on the second characteristic value-containing sequence, and holds the second characteristic value-containing sequence and the characteristic value in the holding unit while associating the second characteristic value-containing sequence with the characteristic value.

6. A computer system comprising:
a holding unit for holding pieces of data as processing objects and first characteristic values calculated based on the pieces of data while associating the pieces of data with the first characteristic values respectively; and
a providing unit for accepting a received characteristic value as an information request for a piece of data as a processing object from a requester and selecting the piece of data associated with the received characteristic value from the pieces of data held by the holding unit to provide the piece of data to the requester;
wherein the holding unit holds a characteristic value calculated by an operation unit based on a second characteristic value set, wherein the piece of data is divided into a sequence of data fragments each having a predetermined size, the second characteristic value set being calculated based on the data fragments; and
the providing unit provides respective second characteristic values contained in the second characteristic value set to the requester when the received characteristic value accepted as an information request for a piece of data as a processing object is associated with the second characteristic value set.

7. An information processing method, comprising:
holding pieces of data as processing objects and first characteristic values calculated based on the pieces of data while associating the pieces of data with the first characteristic values respectively; and accepting a received characteristic value as an information request for a piece of data as a processing object from a requester and selecting the piece of data associated with the received characteristic value from the pieces of data to provide the piece of data to the requester, wherein:

a characteristic value is calculated based on a piece of data as a processing object, the piece of data is divided into a sequence of data fragments each having a predetermined size, second characteristic values are calculated based on the data fragments respectively, the data fragments and the second characteristic values are held while associating the data fragments with the second characteristic values respectively, a sequence of second characteristic values corresponding to the sequence of data fragments is generated, the sequence of second characteristic values is held and the characteristic value is calculated based on the sequence of second characteristic values while associating the sequence of second characteristic values with the characteristic value.

8. The information processing method of claim 7, further comprising holding information for specifying a characteristic value calculation method in association with the characteristic value.

9. The information processing method of claim 7, further comprising holding a characteristic value containing information concerning a predetermined calculation state at a point of time of calculation of the characteristic value.

10. A computer-readable storage medium including a program executed by a computer system, the program comprising:

a procedure for holding pieces of data as processing objects and first characteristic values calculated based on the pieces of data while associating the pieces of data with the first characteristic values respectively; and a procedure for accepting a received characteristic value as an information request for a piece of data as a processing object from a requester and selecting the piece of data associated with the received characteristic value from the pieces of data to provide the piece of data to the requester, wherein:

a characteristic value is calculated based on a piece of data as a processing object, the piece of data is divided into a sequence of data fragments each having a predetermined size, second characteristic values are calculated based on the data fragments respectively, the data fragments and the second characteristic values are held while associating the data fragments with the second characteristic values respectively, a sequence of second characteristic values corresponding to the sequence of data fragments is generated, the sequence of second characteristic values is held and the characteristic value is calculated based on the sequence of second characteristic values while associating the sequence of second characteristic values with the characteristic value.

11. The computer-readable storage medium of claim 10, the program further comprising:

a procedure for holding information for specifying a characteristic value calculation method in association with the characteristic value.

12. The computer-readable storage medium of claim 10, the program further comprising:

a procedure for holding a characteristic value containing information concerning a predetermined calculation state at a point of time of calculation of the characteristic value.

* * * * *